United States Patent
Grove et al.

(10) Patent No.: US 6,777,482 B2
(45) Date of Patent: Aug. 17, 2004

(54) ALTERNATIVE POLYOLEFIN COMPOSITE VEIL/COMPATIBILIZING MAT MATERIAL

(75) Inventors: Dale A. Grove, Pataskala, OH (US); David R. Hartman, Granville, OH (US); Brian W. Bland, Newark, OH (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 141 days.

(21) Appl. No.: 10/116,433

(22) Filed: Apr. 4, 2002

(65) Prior Publication Data

US 2003/0191227 A1 Oct. 9, 2003

(51) Int. Cl.$^7$ ................................................ C08K 3/40
(52) U.S. Cl. .................... 524/495; 524/496; 428/34; 428/332; 264/119
(58) Field of Search ................. 524/495, 486; 428/34, 332; 264/119

(56) References Cited

U.S. PATENT DOCUMENTS

| | | | |
|---|---|---|---|
| 4,240,807 A | | 12/1980 | Kronzer |
| 4,250,222 A | * | 2/1981 | Mavel et al. ............... 442/168 |
| 4,683,165 A | * | 7/1987 | Lindemann et al. ........ 442/173 |
| 4,734,321 A | | 3/1988 | Radvan et al. |
| 5,087,518 A | * | 2/1992 | Shimada et al. ............ 428/372 |
| 5,468,437 A | * | 11/1995 | Hall ............................ 264/119 |
| 5,730,922 A | | 3/1998 | Babb et al. |
| 5,858,160 A | | 1/1999 | Piacente et al. |
| 5,907,006 A | * | 5/1999 | Rennie et al. ............... 524/223 |
| 6,017,832 A | * | 1/2000 | Yahiaoui et al. ............ 442/118 |
| 6,093,359 A | | 7/2000 | Gauchel et al. |
| 6,093,473 A | | 7/2000 | Min |
| 6,140,430 A | | 10/2000 | Ruth et al. |
| 6,174,569 B1 | | 1/2001 | Blomer et al. |
| 6,284,311 B1 | | 9/2001 | Gregorovich et al. |
| 6,294,222 B1 | | 9/2001 | Cohen et al. |
| 6,296,799 B1 | | 10/2001 | Sato et al. |
| 6,309,751 B1 | | 10/2001 | Ruth et al. |
| 6,583,200 B2 | * | 6/2003 | Loontjens et al. .......... 523/216 |

* cited by examiner

*Primary Examiner*—David W. Wu
*Assistant Examiner*—Henry S. Hu
(74) *Attorney, Agent, or Firm*—Inger H. Eckert; Stephen W. Barns; Maria C. Gasaway

(57) ABSTRACT

A compatibilized polyolefin/polyolefin composite material includes a polyolefin/polyolefin composite substrate and a reinforcing mat formed from reinforcing fibers and a thermoplastic polymer powder. The mat may also incorporate an optional emulsion polymer binder. In addition the compatibilized polyolefin/polyolefin composite material may incorporate an additional film layer so that the mat is sandwiched between the substrate and the film layer. A method of producing such materials from a polyolefin/polyolefin composite substrate that is topologically/mechanically bonded to a reinforcing mat formed from reinforcing fibers and thermoplastic polymer powder is also described.

15 Claims, 1 Drawing Sheet

ALTERNATIVE POLYOLEFIN COMPOSITE VEIL/COMPATIBILIZING MAT MATERIAL

TECHNICAL FIELD AND INDUSTRIAL APPLICABILITY OF THE INVENTION

The present invention relates generally to improving surface smoothness, surface hardness, and compatibilizing polyolefin or polyolefin composite materials to functional polymers. A method of producing such materials from a polyolefin/polyolefin composite substrate that is topologically/mechanically bonded to a reinforcing mat formed from reinforcing fibers and thermoplastic polymer powder is described.

BACKGROUND OF THE INVENTION

Plastic sheet materials made from polyolefin or polyolefin composite materials are widely used in the manufacture of molded articles. Such materials suffer from bonding issues, little to no surface abrasion resistance, coupled with composite form process issues. Accordingly, when used for certain applications such as, for example, high impact paneling, woven fiberglass/polyolefin materials have a tendency to develop sink marks that many consumers find detrimental to their aesthetic appearance. It should also be appreciated that polyolefin and polyolefin composite materials are often difficult to adhere or bond to other materials. This can limit the application of these materials particularly where decorative attributes are required.

A need is therefore identified for a way to effectively provide surface enhancements and improved bondability to polyolefin and polyolefin composite materials. Preferably, the fiber reinforcement will be accomplished in a manner that not only provides increased strength and rigidity when employed with straight polyolefin materials but also compatibilizes the polyolefin and polyolefin composite materials for better bonding to other materials and also functions to provide smoother surfacing and a wider range of decorative possibilities. The present invention successfully achieves these goals while also minimizing the application of heat to the polyolefin/polyolefin composite material prior to molding into the final product shape. Thus, a number of important properties including surface energy, surface smoothness, and improvements in impact, flexural and tensile strengths of straight polyolefin materials can be achieved.

SUMMARY OF THE INVENTION

In accordance with the purposes of the present invention as described herein, a compatibilized polyolefin/polyolefin composite material is provided. That material comprises a polyolefin/polyolefin composite substrate and a reinforcing mat. Bonding between chemically incompatible groups within the mat and polyolefin is achieved through a mechanical bonding or topological affect whereby the polyolefin material flows into the reinforcing mat layer, gets caught between the more viscous mat binder, and achieves a mechanical interlock.

The reinforcing mat is formed from reinforcing fibers selected from a group consisting of glass fibers, carbon fibers, aramid fibers, kenaf fibers, hemp fibers, cellulose fibers and mixtures thereof and a thermoplastic polymer powder selected from a group of materials consisting of phenolic powders, phenoxy powders, polyester melt adhesive powders, modified polyethylene powders, PVC/PVDC copolymer powders, EVA powders, PVA powders, acrylic powders, polyester powders, PVC/PVAc copolymer powders and mixtures thereof.

The phenolic powders include novalak, cresol type and resorcinol type powders. More specifically describing the invention, the phenoxy based epoxy powders include various melting point materials made possible by increasing the degree of polymerization between Bisphenol A and epichlorohydrin. Polyester melt adhesive powders include low molecular acids, such as terephthalic, adipic, isophthalic, phthalic, azelaic, linoleic, oleic and sebacic, reacted with diols such as ethylene glycol, 1,4 butanediol, 1,6-hexanediol and 1,4-cyclohexanedimethanol. In all cases, the melting point of the mat binder should either exceed the melting point of the polyolefin or the selected binder must be considerably more viscous than the selected polyolefin.

The modified polyethylene based resin powders include acid modified and/or maleic anhydride grafted polyolefins combined with a filler to increase the specific gravity of the powder to at least 1 gm/cm$^3$. The polyester powders include thermosetting type polyesters that employ multifunctional acids and diols. The acrylic powders include higher glass transition acrylics like polymers formed from methacrylic acid, acrylic acid and methyl methacrylate or thermosetting acrylic materials that employ functional hydroxy groups like 2-hydroxyethyl methacrylate, 2-hydroxypropyl methacrylate and the like.

The reinforcing fibers provided in the mat have a diameter of between about 10 to about 23 microns and a length of between about 0.25 to 1.5 inch. The reinforcing fibers are provided in the reinforcing mat at between about 20 to 40 weight percent and the thermoplastic polymer powder is provided at between about 60 to 80 weight percent. In accordance with an additional aspect of the present invention the mat may also incorporate an emulsion polymer binder. That emulsion polymer binder may be an acrylic emulsion. Where the mat incorporates an emulsion polymer binder, the reinforcing fibers are provided at between about 20 to 40 weight percent, the thermoplastic polymer powder is provided at between about 40 to 75 weight percent and the polymer binder is provided at between about 5 to 10 weight percent. The purpose of the emulsion binder is to minimize possible fiber dusting complaints during the final consolidation step by providing further bonding ease of the thermoplastic powder to the reinforcing glass fibers.

In accordance with still another aspect of the present invention, the compatibilized polyolefin/polyolefin composite material may further include a film against the mat so that the mat is disposed between the film and the polyolefin/polyolefin composite substrate. The film is formed from a material selected from a group consisting of PVC, PVC/PVAc copolymer, PVC/PVDC copolymer, PVDC, ABS, acrylic, polyester and mixtures thereof.

In accordance with an additional aspect of the present invention, a method of compatibilizing a polyolefin/polyolefin composite material is provided. The method includes contacting a reinforcing mat formed from reinforcing fibers selected from a group consisting of glass fibers, carbon fibers, aramid fibers, kenaf fibers, hemp fibers, cellulose fibers and mixtures thereof and a thermoplastic polymer selected from a group of materials consisting of phenolic powders, phenoxy based epoxy powders, polyester melt adhesive powders, modified polyethylene based resin powders, PVC/PVDC copolymer powders, EVA powders, PVA powders, acrylic powders, polyester powders, PVC/PVAc copolymer powders and mixtures thereof with a polyolefin/polyolefin composite substrate. Still further, the method may include a polymer binder in the mat such as an acrylic emulsion. Additionally, the method includes a step of applying sufficient temperature and pressure for a sufficient time to consolidate the mat and substrate.

More specifically describing the invention, the method includes selecting a pressure of between about 50 to about 300 psi for application to the mat and substrate at a temperature between about 350 to about 450EF for a period of time of between about 10 to about 300 seconds.

In addition, the method may include the step of adding a film against the mat. The film is selected from a group of materials consisting of PVC, PVC/IPVAc copolymer, PVC/PVDC copolymer, PVDC, ABS, acrylic, polyester and mixtures thereof. Films are normally applied for various purposes including decorative, UV resistance, or enhanced bondability to decals.

Advantageously, the resulting compatibilized polyolefin/polyolefin composite material is only subjected to one heat treatment to both (a) consolidate the mat and substrate together and (b) mold the material into its final shape. Since this is done in a single heating step, the material is subjected to fewer heat cycles and the material accordingly has observed less thermal cycles. It is also provided with veil possibilities and the polyolefin/polyolefin composite material is made more compatible for binding with other materials. When employing woven glass/polyolefin composites, sink marks often occur without the presence of a surfacing veil. This invention provides surfacing veil characteristics coupled with enhanced surface bondability in a single step. Although alternative methods of bonding polyolefin materials to other materials exist, as is made possible by grafting acrylic acid, maleic anhydride, and other function groups, and/or by the incorporation of corona discharge, plasma treatment, or flame treatment, these alternative methods can not provide smoothening effects, a harder more scratch resistant surface, or permanent chemical changes without grafting reactions.

In the following description there is shown and described the preferred embodiment of this invention simply by way of illustration of several modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
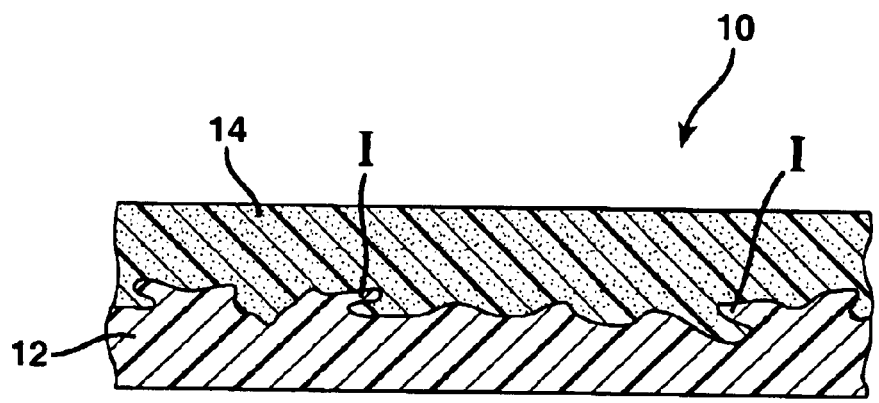
FIG. 1 is a schematical cross sectional view showing a first embodiment of the compatibilized polyolefin/polyolefin composite material of the present invention.

Reference is now made to FIG. 1 schematically illustrating one possible embodiment of the compatibilized polyolefin/polyolefin composite material of the present invention. The material 10 includes a polyolefin/polyolefin composite substrate 12 and a reinforcing mat 14.

The polyolefin/polyolefin composite substrate may, for example, be made from high density polyethylene, polypropylene, polybutylene, mixed with various chemical additives such as heat stabilizers, UV stabilizers, metal deactivators, and the like possibly combined with grafted species that incorporate acrylic acid or maleic anhydride to promote the bondability of the polyolefin to whatever glass fiber form is employed. Composite forms may include injection moldable grades, extrusion-compression molded long fiber grades, GMT forms as for example an Azdel® type product, or in a woven roving form as for example a Twintex® product grade.

The reinforcing mat 14 is formed from reinforcing fibers and a thermoplastic polymer powder. The reinforcing fibers are selected from a group consisting of glass fibers, carbon fibers, aramid fibers, kenaf fibers, hemp fibers, cellulose fibers and mixtures thereof. When moisture resistance is required, the thermoplastic polymer powder is selected from a group of hydrolysis resistant materials including phenolic powders, phenoxy powders, polyester melt adhesive powders, modified polyethylene powders and PVC/PVDC copolymer powders. When moisture resistance is not a requirement for a particular application, the thermoplastic polymer powder may also be selected from other, nonhydrolysis resistant melt adhesive powders, polyvinyl acetate powders, EVA powders, PVC/PVAc copolymer powders and any mixtures thereof.

Still more specifically describing the invention, the phenolic powders may include novalak, cresol type and/or resorcinol type powders. The phenoxy based epoxy powders may include various melting point materials made possible by increasing the degree of polymerization between Bisphenol A and epichlorohydrin. The polyester melt adhesive powders include lower molecular acids, such as terephthalate, adipic, isophthalic, phthalic, azelaic, diacids (linoleic, oleic and soybean) and sebacic, reacted with diols such as ethylene glycol, 1,4 butanediol, 1,6-hexanediol and 1,4-cyclohexanedimethanol. The modified polyethylene based resin powders include acid modified and/or malaic anhydride grafted polyolefins combined with a filler to increase the specific gravity of the powder to at least 1 gm/cm$^3$. Acrylic powders include higher glass transition acrylics like polymers formed from methacrylic acid, acrylic acid and methyl methacrylate or thermosetting acrylic materials that employ functional hydroxy groups like 2-hydroxyethyl methacrylate, 2-hydroxypropyl methacrylate and the like. If crosslinking is employed with the acrylic version, it must be light to allow the acrylic to seal the composite from polyolefin bleed through.

The mat 14 may also, optionally, incorporate an emulsion polymer binder. That polymer binder may take the form of an acrylic emulsion.

The reinforcing fibers present in the mat typically have a diameter between about 10 to about 23 and more typically, about 10 to about 16 micron and a length between about 0.25 to about 1.5 inch. Still further, the reinforcing fibers are provided at between about 20 to about 40 weight percent while the thermoplastic polymer powder is provided at between about 60 to about 80 weight percent of the mat.

Figure 2:
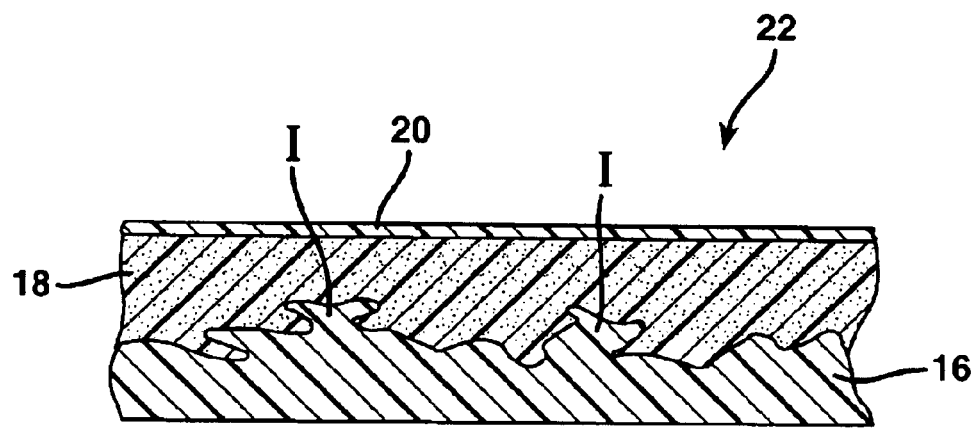
FIG. 2 is a schematic cross sectional view showing a second embodiment of the compatibilized polyolefin/polyolefin composite material of the present invention.

The embodiment of the present invention shown in FIG. 2 includes a substrate 16, a mat 18 and a film 20. Thus, the mat 18 has the substrate 16 on one side and the film 20 on the other. The substrate 16 of the second embodiment is identical to the substrate 12 described in detail above when discussing the first embodiment shown in FIG. 1. Similarly, the mat 18 is identical to the mat 14 described in detail above when discussing the first embodiment. The film 20 is formed from a material selected from a group consisting of PVC, PVC/PVAc copolymer, PVC/PVDC copolymer, PVDC, ABS, acrylic, polyester and mixtures thereof.

Like the mat 14 of the first embodiment, the mat 18 of the second embodiment may also incorporate an emulsion polymer binder such as an acrylic emulsion. Additionally, the reinforcing fibers of the mat 18 also have a diameter of between about 10 to about 23 micron and a length of between about 0.25 to about 1.5 inch. The mat 18 has reinforcing fibers present in an amount of between about 20–40 weight percent, thermoplastic polymer powder present in an amount of between about 40 and about 75 weight percent and polymer binder present in an amount of about 5 to about 10 weight percent. The compatibilized polyolefin/polyolefin composite material 22 of the second embodiment has an overall density of between about 0.9 to about 1.9 gm/cm$^3$, depending upon the level of glass reinforcement, with the substrate 16 present at between about 87 to about 99 weight percent, the mat 18 present at between about 0.7 to about 10 weight percent and the film 20 present at between about 0.3 to about 3 weight percent.

The material 10 illustrated in FIG. 1 is made by a method that may be broadly defined as including the steps of: (1) contacting a reinforcing mat formed from reinforcing fiber selected from a group consisting of glass fibers, carbon fibers, aramid fibers, kenaf fibers, hemp fibers, cellulose fibers and mixtures thereof and a thermoplastic polymer selected from a group of materials consisting of phenolic powders, phenoxy based epoxy powders, polyester melt adhesive powders, modified polyethylene based resin powders, PVC/PVDC copolymer powders, EVA powders, PVA powders, acrylic powders, polyester powders, PVC/PVAc copolymer powders and mixtures thereof with a polyolefin/polyolefin composite substrate and (2) applying sufficient temperature and pressure for a sufficient time to consolidate the mat and the polyolefin/polyolefin composite substrate. The material 22 illustrated in FIG. 2 is also made by means of these contacting and applying steps but includes the additional step of adding a film 20 against the mat 18 so that the mat 18 is disposed between the film 20 and the substrate 16 prior to the applying step. If a single sided film application is to be performed, the film thickness should be minimized to prevent warping issues. If this is not possible, then a symmetric structure would be necessary where a film layer, mat layer, polyolefin/polyolefin composite, mat layer, and film layer arrangement would be necessary to prevent warpage.

In either of the materials 10, 22 shown respectively in FIGS. 1 and 2, the mat 18 is produced by forming an aqueous suspension of discontinuous fibers and an aqueous suspension of the thermoplastic polymer powder or powders. This is typically accomplished with agitation in a mixing tank. The resulting combined aqueous suspension, slush or pulping medium is then processed into a wet-laid, sheet-like material by machines such as cylinder Fourdinier machines or other technologically advanced machinery such as the Stevens Former, Roto Former, Inver Former and VertiFormer machines. Specifically, the combined aqueous suspension is deposited from a head box onto a moving wire screen or on to the surface of a moving wire-covered cylinder. The combined aqueous suspension or slurry on the screen or cylinder is then processed into a nonwoven, sheet-like mat by the removal of water. This is typically accomplished by a suction or vacuum device. This process is exemplified in, for example, U.S. Pat. No. 5,393,379 and is well known in the art.

After the mat is formed into a dewatered sheet, it may be densified by pressing with a flat press or sending through calendering rolls. The densification of the mat after drying is particularly useful to increase the tensile and tear strength of the mat. Drying may be completed either by air drying at ambient temperature or oven drying.

The prepared mat is then positioned to contact and rest upon an underlying polyolefin/polyolefin composite substrate. The optional film 20 may then be added on lop of the mat when the presence of the film is desired in the final product. Once the substrate 12, 16, mat 14, 18 and optional film 20 (if present) are positioned in contact with each other, the material 10, 22 is molded into a desired shaped by closing the appropriate mold platens for forming the desired article and applying a pressure to the material 10,22 of between about 50 to about 300 psi with the platens at a temperature of between about 350 to about 450° F. for a period of time of between about 10 to about 300 seconds. This heat and pressure serves to activate the thermoplastic polymer powder in the mat 14, 18 and to force the polymer of the substrate 12, 16 and film 20 (if present) to partially flow into the mat layer where it mechanically/topologically interlocks with the mat binder in the manner of jigsaw puzzle pieces or a Velcro fastener (note interlocking shown at, for example, I in the drawing figures). Polyolefin bleed through through the mat layer is prevented by employing sufficient basis weight mat, such as 0.2–0.08 lb/ft$^2$ basis weights and by selecting thermoplastic binder resins which seal the mat layer from surging polyolefin flow in the z direction. The material 10, 22 is then cooled by cooling the platens or by some other means to set the polymer materials and thereby consolidate the substrate 12, 16 with the mat 14, 18 and the film 20 (if present).

The compatibilized polyolefin/polyolefin composite materials 10, 22 of the present invention exhibit a number of unique properties. Due to exposure to a limited number of heating cycles, impact, flexural and tensile strengths may be improved. The addition of the mat also provides veil possibilities for the polyolefin composites and serves to compatibilize the polyolefin/polyolefin composite substrate for bonding to other materials. The mat also provides an effective hard surface layer for the polyolefin/polyolefin composite based substrate. Where hydrolysis resistant powders are utilized in the mat moisture resistance may be enhanced if the polyolefin composite interface was insufficient to prevent wicking.

The following examples are presented to further illustrate the invention, but it is not to be considered as limited thereto.

EXAMPLE 1

A 22 oz/yard$^2$, seventy weight percent, woven Twintex® material, 0.06 lb/ft$^2$ mat material comprising of 70 weight percent glass fibers coupled with 30 percent by weight rigid PVC may be combined to form a bondable surface by placing both materials flat into a preheated mold at 370° F., holding both materials together for approximately 30 seconds at 100 psi, and cooling the assembly to 240° F. prior to removing the assembly from the press. The resulting composite will form a strong mechanical bond that is unbreakable even under extreme temperature and moisture cycling such as consecutively submitting the material to boiling water and a dry ice environments.

EXAMPLE 2

A 44 oz/yard$^2$, seventy weight percent, woven Twintex® material, 0.06 lb/ft$^2$ mat comprising of 70 weight percent glass fibers coupled with 30 percent by weight PVC, and a white rigid PVC film of 0.003 mil thickness, may be combined to form a hard decorative surface by placing both materials flat into a preheated mold at 370° F., holding both materials together for approximately 30 seconds at 100 psi, and cooling the assembly to 240° F. prior to removing the assembly from the press. The resulting composite will form a strong mechanical bond that is unbreakable even under extreme temperature and moisture cycling such as consecutively submitting the material to boiling water and a dry ice environments.

EXAMPLE 3

A 44 oz/yard$^2$, seventy weight percent, woven Twintex® material, 0.06 lb/ft$^2$ mat comprising of 65 weight percent glass fibers coupled with 30 percent by weight PVC, and 5 weight percent acrylic binder, and a white rigid PVC film of 0.003 mil thickness, may be combined to form a hard decorative surface by placing both materials flat into a preheated mold at 370° F., holding both materials together for approximately 30 seconds at 100 psi, and cooling the assembly to 240° F. prior to removing the assembly from the press. The resulting composite will form a strong mechanical bond that is unbreakable even under extreme temperature and moisture cycling such as consecutively submitting the material to boiling water and a dry ice environments.

The foregoing description of the preferred embodiment of the invention has been presented for purposes of illustration and description. It is not intended to be exhaustive or to limit the invention to the precise form disclosed. Obvious modifications or variations are possible in light of the above teachings.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A compatibilized polyolefin/polyolefin composite material, comprising:
    a polyolefin/polyolefin composite substrate; and
    a reinforcing mat formed from reinforcing fibers selected from a group consisting of glass fibers, carbon fibers, aramid fibers, kenaf fibers, hemp fibers, cellulose fibers and mixtures thereof and a thermoplastic polymer powder selected from a group of materials consisting of phenolic powders, phenoxy powders, polyester melt adhesive powders, modified polyethylene powders, PVC/PVDC copolymer powders, EVA powders, PVA powders, acrylic powders, polyester powders, PVC/PVAc copolymer powders and mixtures thereof.

2. The material of claim 1, wherein said phenolic powders include novalak, cresol and resorcinol powders.

3. The material of claim 1, wherein said polyester melt adhesive powders include lower molecular weight acids of terephthalic adipic, isophthalic, phthalic, linoleic, oleic and sebacic reacted with diols of ethylene glycol, 1,4 butanediol, 1,6-hexanediol and 1,4-cyolohexanedimethanol.

4. The material of claim 1, wherein said modified polyethylene based resin powders include acid modified and/or maleic anhydride grafted polyolefins combined with a filler to increase the specific gravity of the powder to at least 1 gm/cm$^3$.

5. The material of claim 1, wherein said polyester powders include thermosetting type polyesters that employ multifunctional acids and diols.

6. The material of claim 1, wherein said acrylic powders include higher glass transition acrylics like polymers formed from methacrylic acid, acrylic acid and methyl methacrylate or thermosetting acrylic materials that employ functional hydroxy groups like 2-hydroxyethyl methacrylate, 2-hydroxypropyl methacrylate and the like.

7. The material of claim 1, wherein said reinforcing fibers have a diameter between about 10 to about 23 microns and a length between about 0.25 to about 1.5 inch.

8. The material of claim 1, wherein said reinforcing fibers are provided at between about 20 to about 40 weight percent and said thermoplastic polymer powder is provided at between about 60 to about 80 weight percent.

9. The material of claim 1, wherein said mat also incorporates an emulsion polymer binder.

10. The material of claim 9, wherein said polymer binder is an acrylic emulsion.

11. The material of claim 9, wherein said reinforcing fibers are provided at between about 20 to about 40 weight percent, said thermoplastic polymer powder is provided at about 40 to about 75 weight percent and said polymer binder is provided at about 5 to about 10 weight percent.

12. The material of claim 1 further including a turn against said mat.

13. The material of claim 12, wherein said film is formed from a material selected from a group consisting of PVC, PVC/PVAc copolymer, PVC/P VDC copolymer, PVCDJ, ABS, acrylic, polyester and mixtures thereof.

14. The material of claim 13, wherein said material has an overall density of between about 0.9 to about 1.9 gm/cm$^3$, depending upon the level of glass reinforcement, and comprises from about 87 to about 99 weight percent polyolefin/polyolefin composite substrate, about 0.7 to about 10 weight percent reinforcing mat and about 0.3 to about 3 weight percent film.

15. A compatibilized polyolefin/polyolefin composite material, comprising:
    a polyolefin/polyolefin composite substrate; and
    a reinforcing mat formed from reinforcing fibers selected from a group consisting of glass fibers, carbon fibers, aramid fibers, kenaf fibers, hemp fibers, cellulose fibers and mixtures thereof and a thermoplastic polymer powder selected from a group of materials consisting of phenolic powders, phenoxy powders, polyester melt adhesive powders, modified polyethylene powders, PVC/PVDC copolymer powders, EVA powders, PVA powders, acrylic powders, polyester powders, PVC/PVAc copolymer powders and mixtures thereof, wherein said mat also incorporates an emulsion polymer binder,
    wherein said polyolefin/polyolefin composite substrate is interlocked with said reinforcing mat binder.

* * * * *

UNITED STATES PATENT AND TRADEMARK OFFICE
CERTIFICATE OF CORRECTION

PATENT NO. : 6,777,482 B2
DATED : August 17, 2004
INVENTOR(S) : Grove

It is certified that error appears in the above-identified patent and that said Letters Patent is hereby corrected as shown below:

Column 8,
Line 31, "turn" should be -- film --
Line 35, "PVC/P VDC" should be -- PVC/PVDC --
Line 35, "PVCDJ" should be -- PVCD --

Signed and Sealed this

Eighth Day of March, 2005

JON W. DUDAS
*Director of the United States Patent and Trademark Office*